(No Model.)

U. H. PALMER.
Wheat Heater for Flour Mills.

No. 236,249.  Patented Jan. 4, 1881.

WITNESSES:
Francis McArdle.
C. Sedgwick

INVENTOR:
U. H. Palmer
BY
Munn & Co.
ATTORNEYS.

N. PETERS, PHOTO-LITHOGRAPHER, WASHINGTON, D. C.

UNITED STATES PATENT OFFICE.

URA H. PALMER, OF ELIZAVILLE, KENTUCKY.

WHEAT-HEATER FOR FLOUR-MILLS.

SPECIFICATION forming part of Letters Patent No. 236,249, dated January 4, 1881.

Application filed August 14, 1880. (No model.)

*To all whom it may concern:*

Be it known that I, URA H. PALMER, of Elizaville, in the county of Fleming and State of Kentucky, have invented a new and useful Improvement in Wheat-Heaters for Flour-Mills, of which the following is a specification.

Figure 1:
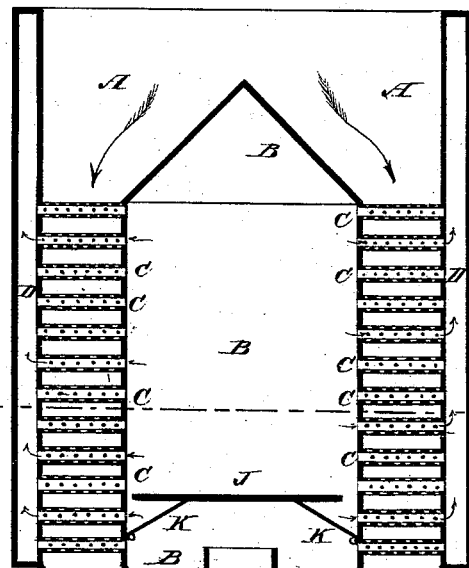
Figure 2:
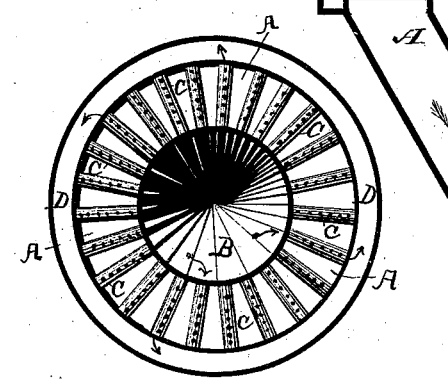
Figure 3:
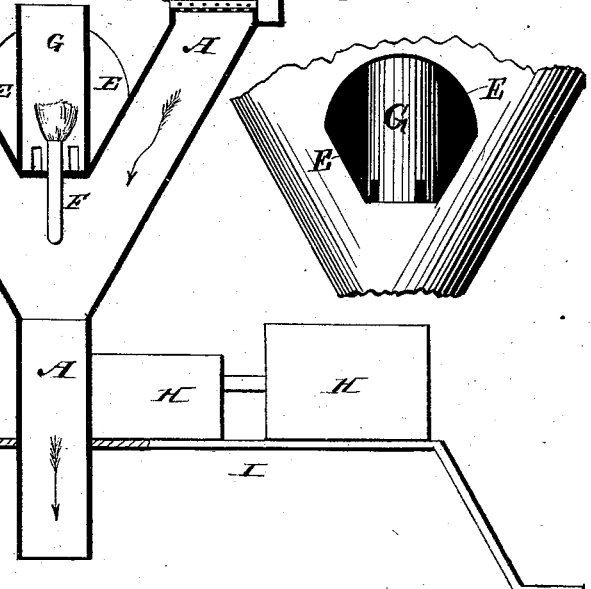

Figure 1 is a sectional elevation. Fig 2 is a transverse section on line $x$ $x$ of Fig. 1; and Fig. 3 is an elevation, partly broken away to show the air-opening.

The object of this invention is to furnish simple and convenient heaters for heating wheat and other grains as they pass to the millstones, so constructed as to heat the wheat by the direct contact of heated air.

The heater may be round or square, or of any other desired form. A are the passages through which the wheat passes to the millstones, and which surround an air-chamber, B. From the air-chamber B tubes C lead across the passages A to an air-chamber, D, surrounding the passages A. The tubes C are open at both ends, and are perforated with numerous holes, through which the air passes into the passages A and comes into direct contact with the wheat. The outer air-chamber, D, is entirely closed, except the open ends of the tubes C, and is designed to equalize the distribution of the air. The upper end of the inner air-chamber, B, is closed and is made conical, so that it will not obstruct the descent of the wheat, and will guide the wheat into the passages A. The lower part of the inner air-chamber, B, is closed, except an opening, E, to admit air to the lamp F and to give convenient access to the lamp.

The burner of the lamp F is provided with a chimney, G, to promote combustion and prevent smoke. The lamp F receives oil from the reservoir H, placed upon the frame I, that supports the heater and is attached to the curb of the millstones.

Above the lamp F is placed a plate, J, to receive and collect the soot, and which is supported by the walls of the chamber B by arms K. The plate J also distributes the heated air, and causes it to pass up close to the inner ends of the perforated tubes C, so that it will more readily enter the said tubes.

By this construction is produced a neat and compact heater that will heat the wheat effectively and at a comparatively small expense.

Having thus described my invention, what I claim as new, and desire to secure by Letters Patent, is—

In a wheat-heater, the combination, with the wheat-passages A, of the inner air-chamber, B, the outer air-chamber, D, the perforated connecting-tubes C, and the lamp F, substantially as herein shown and described, whereby air heated by a lamp is caused to pass through the stream of wheat, as set forth.

URA H. PALMER.

Witnesses:
  Mrs. ELLA PALMER,
  THOMAS I. DILLON.